United States Patent
Sandiford

[11] 3,893,655
[45] July 8, 1975

[54] APPARATUS AND METHOD FOR DISPERSING SOLID PARTICLES IN A LIQUID

[75] Inventor: Burton B. Sandiford, Placentia, Calif.

[73] Assignee: Union Oil Company of California, Brea, Calif.

[22] Filed: Aug. 9, 1973

[21] Appl. No.: 387,176

Related U.S. Application Data

[63] Continuation-in-part of Ser. No. 270,495, July 10, 1972, Pat. No. 3,782,695.

[52] U.S. Cl.............................. 259/4; 259/95
[51] Int. Cl.................................. B01f 15/02
[58] Field of Search.......... 259/4, 18, 95, 96, 36, 259/164, 165, 168, 147

[56] References Cited
UNITED STATES PATENTS

| 724,580 | 11/1955 | Revallier | 259/4 |
| 147,955 | 9/1964 | Harvey | 259/18 |
| 194,539 | 7/1965 | Hanne | 259/4 |
| 212,757 | 10/1965 | Martin | 259/4 |
| 3,306,342 | 2/1967 | Salvo | 259/4 |
| 3,381,943 | 5/1968 | Miller | 259/4 |

*Primary Examiner*—Robert W. Jenkins
*Attorney, Agent, or Firm*—Dean Sandford; Richard C. Hartman; Lannas S. Henderson

[57] ABSTRACT

An apparatus and method for dispersing a particulate solid material in a liquid. The apparatus includes a vertically mounted wetted wall funnel having a throat of reduced cross-section at the bottom, a solids container, solids conduit means communicating the solids container and the wetted wall funnel, means for flowing liquid over the interior surface of the wetted wall funnel, liquid conduit means attached to and communicating with the throat of the wetted wall funnel for flowing liquid past the throat of the funnel, and a pump for inducing a vacuum in the liquid conduit means at the throat of the funnel. The particulate solid material is distributed onto the interior surface of the wetted wall funnel and the solids-liquid mixture withdrawn from the funnel and admixed into the liquid flowing past the throat of the funnel.

15 Claims, 5 Drawing Figures

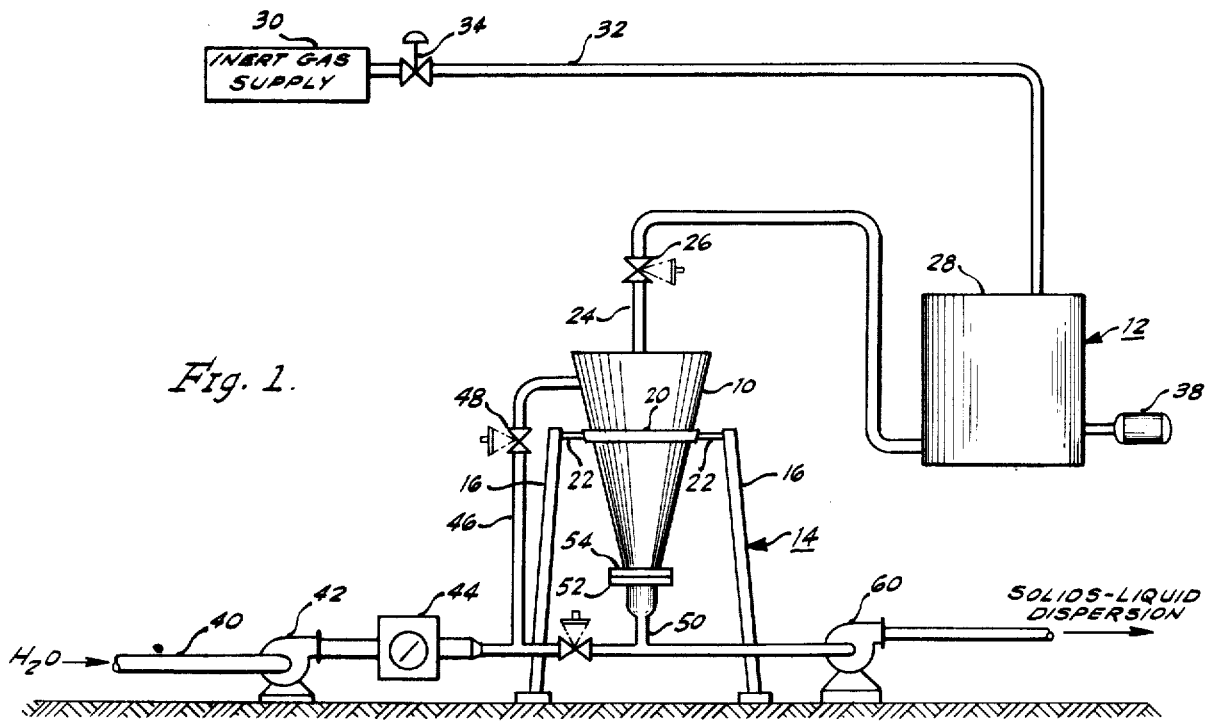
Fig. 1.
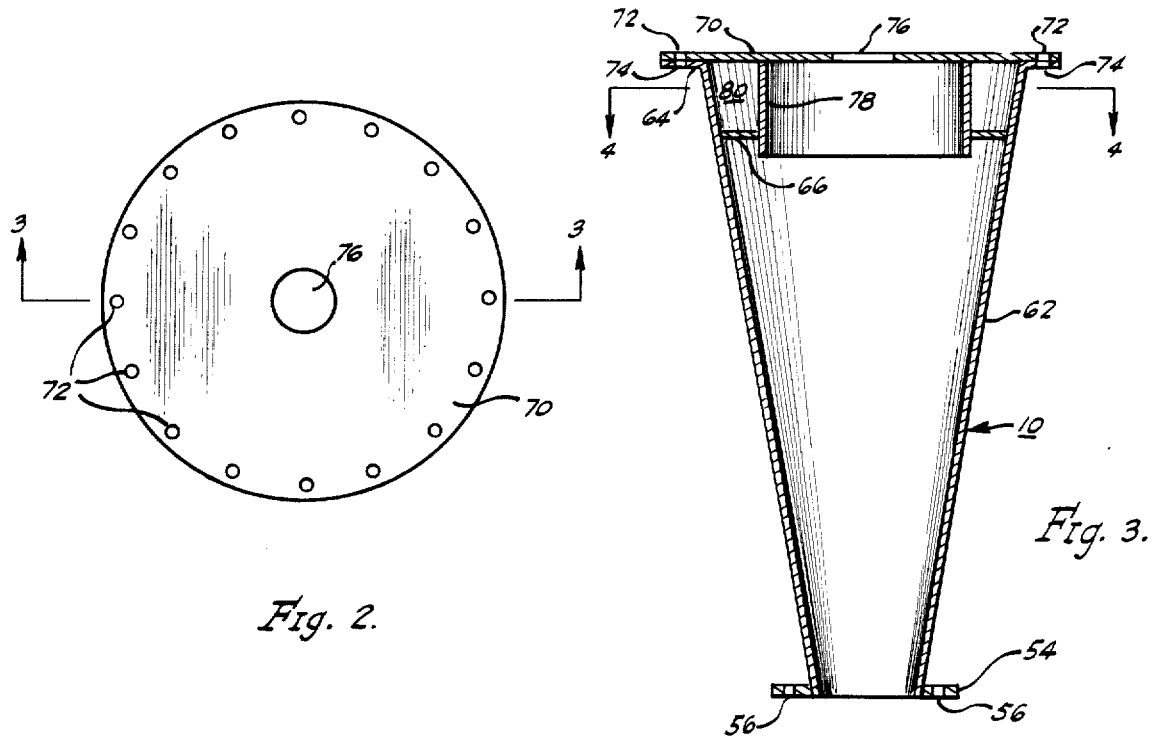
Fig. 2.
Fig. 3.

APPARATUS AND METHOD FOR DISPERSING SOLID PARTICLES IN A LIQUID

This is a continuation-in-part of application Ser. No. 270,495, filed July 10, 1972, now U.S. Pat. No. 3,782,695.

This invention relates to solids-liquid mixing, and more particularly concerns an apparatus and method for mixing difficultly dispersible particulated solid materials into a liquid.

Many industrial operations require the dispersion of a particulated solid material into a liquid, both where the ultimate product is a solids in liquid dispersion and where the solid is dissolved by the liquid to form a true solution. The production of uniform solids-liquid dispersions is especially troublesome where the solid material tends to form lumps or agglomerates which are wetted on the exterior by the liquid, but which are relatively dry or liquid-free on the interior. These glomules are often relatively stable and require severe mixing or milling to obtain dispersion, and in many cases the liquid-wetted glomules cannot be broken up by a reasonable amount of mixing.

For example, various water-soluble polymers have been developed which in aqueous solution exhibit superior thickening and flocculating properties. These polymers are being increasingly employed in a number of commercial applications, such as for example, in the clarification of aqueous solutions of uranium salts, in sizing paper and textiles, in the treatment of sewage and industrial wastes, as stabilizers for drilling muds, in the secondary recovery of petroleum by water flooding, and in other well treating applications. While various natural water-soluble polymers and gums have long been used, some of the more recently developed synthetic polymers are desirable because of their greater uniformity and further because substantial thickening can be achieved at relatively low polymer concentrations.

Although these polymers are most often available commercially as powders, or otherwise in finely divided solid form, they are usually most advantageously utilized in aqueous solution. Accordingly, the solid polymer material must be dissolved in water or other aqueous liquid. Although the various polymers are more or less soluble in water, difficulty is often experienced in preparing aqueous polymer solutions because of the slow dissolution rate of many of these polymers and because the solid polymer is not readily dispersible in water.

Dispersion of the solid polymer in water is hindered by the tendency of the solid to cake on contact with water. Lumps of solid material are formed by the encapsulation of undissolved solid in an outer coating of water-wet polymer which retards the penetration of additional water into the agglomerate. Although many of these lumps are finally dissolved by continued agitation, it is frequently impractical to agitate the solution for a sufficiently long period to obtain complete dissolution. In many applications, such as water flooding, for example, solids cannot be tolerated. Thus, the residual polymer solids must be removed by a separate filtration step. Not only does poor dispersion of the polymer result in the necessity of the additional filtration step and waste of the undissolved polymer, but also the final solution is less beneficially treated.

Heretofore, various dispersion apparatus have been proposed to effect dissolution of the solid polymer. Several of these devices function by creating a vortex into which the polymer solid is added in sufficiently small quantities that dispersion is substantially effected without agglomeration or lumping. However, even with the best of these previously known devices, dissolution of the polymer is time-consuming and a certain amount of agglomeration occurs, thus necessitating additional filtration to assure a solids-free aqueous polymer solution. Also, these devices are often subject to plugging, blockage, and other operating difficulties, and often require the attention of several men for their operation. Hence, need exists for a simple, compact, easily operated, solids-liquid mixing device for dispersing particulate solid materials in a liquid.

Accordingly, it is an object of the present invention to provide an improved apparatus and method for dispersing a particulate solid material in a liquid.

Another object of the invention is to provide an apparatus and method for dispersing a particulate solid polymer in an aqueous liquid.

Still another object of the invention is to provide an apparatus and method for effecting the dissolution of a difficultly soluble, particulated, water-soluble polymer in an aqueous liquid.

A still further object of the invention is to provide a relatively simple, reliable, easily operated, inexpensive solids-liquid mixing device.

Other objects and advantageous of the invention will be apparent from the following description.

Briefly, this invention involves an apparatus and method for dispersing a particulate solid material in a liquid. The apparatus includes a vertically mounted, wetted wall funnel having a throat of reduced cross-section at the bottom, a solids container, solids conduit means communicating the solids container and the wetted wall funnel for introducing the particulate solid material into the wetted wall funnel, means for flowing liquid over the interior surface of the wetted wall funnel, liquid conduit means attached to and communicating with the throat of said wetted wall funnel for flowing liquid past the throat of the funnel, and a pump for inducing a vacuum in the liquid conduit means at the throat of the funnel. In operation, the particulate solid material is distributed onto the interior surface of the wetted wall funnel and the solids-liquid mixture is withdrawn from the funnel and admixed into the liquid flowing past the throat of the funnel.

The invention will be more readily understood by reference to the accompanying drawings, in which:

FIG. 1 is a side elevation view schematically illustrating the solids-liquid mixing apparatus of this invention;

FIG. 2 is a top view of the wetted wall funnel;

FIG. 3 is a vertical cross-sectional view of the wetted wall funnel taken along the line 3—3 of FIG. 2;

Figure 4:
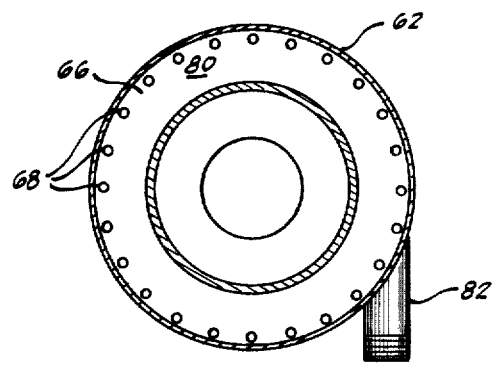
FIG. 4 is a horizontal cross-sectional view of the wetted wall funnel taken along the line 4—4 of FIG. 3.

Referring now to FIG. 1, the solids-liquid mixing apparatus of this invention is comprised of wetted wall funnel 10 and solids container 12. Wetted wall funnel 10 is supported in a substantially vertical position by any suitable support means, such as the frame 14. In the illustrated embodiment, frame 14 is a tripod support comprised of three slightly inclined legs 16 and a transverse support ring 20 attached to legs 16 by support members 22 and adapted to supportably receive wetted wall funnel 10. While this arrangement provides a convenient mode of supporting wetted wall funnel 10, it is to be recognized that any suitable means of supporting wetted wall funnel 10 in a substantially vertical position can be employed. Solids conduit 24 having valve 26 therein connects solids container 12 with wetted wall funnel 10 to conduct the particulate solid material from solids container 12 to the wetted wall funnel.

Solids container 12 can be a tank, vessel, hopper, pit, or drum of any suitable configuration adapted to receive a bulk quantity of the particulated solid material, and can be located in any convenient location adjacent to wetted wall funnel 10, either above, at the same level, or below funnel 10. One suitable configuration shown in the illustrated embodiment is a vessel of a size sufficient to contain a desired quantity of the particulate solid material. Solids container 12 can have an open top, or optionally, a substantially air tight cover 28 can be provided. Of course, a suitable hatch or lid must be provided in cover 28 to permit placement of the particulate solid material in solids container 12. Where solids container 12 is provided with the cover 28, it is preferred that inert gas be introduced into solids container 12 to maintain a substantially atmospheric pressure blanket of gas above the body of solid material in the container. Inert gas can be supplied from inert gas supply source 30 which is connected to solids container 12 by conduit 32 having pressure regulator 34 therein. Also, solids container 12 can be optionally provided with a vibrator 38 mounted so as to engage the wall of the container and agitate the contents thereof to facilitate flow of the particulate material from the container. Vibrator 38 can be electrically or pneumatically driven. Alternatively, a mixer, not shown, having a shaft extending into the container 12 can be employed to agitate the contents of the container.

Liquid is supplied to the solids-liquid mixer through liquid supply conduit 40, preferably at a pressure of about 30 to 70 psig, and most preferably at a pressure of about 50 psig. Booster pump 42 can be optionally provided in the conduit 40 to obtain an adequate liquid supply pressure where the pressure is otherwise too low. Also, meter 44 can be optionally installed in liquid supply conduit 40 to measure the volume of liquid supplied to the solids-liquid mixer. A portion of the liquid flowing through conduit 40 is diverted through conduit 46 and valve 48 to wetted wall funnel 10 and distributed over the interior wall of the funnel in a manner that will be hereinafter more fully described.

A Tee-conduit section 50 of liquid conduit 40 having a reduced cross-section is attached to the bottom of wetted wall funnel 10 by means of the flange 52 which mates with a similar flange 54 on the bottom of funnel 10. A relatively high capacity pump 60 is located in conduit 40 downstream of Tee section 50. Pump 60 is of the self priming type having sufficient capacity to produce a vacuum in Tee section 50 under normal liquid flow rates. A particularly suitable pump is a self-priming, flexible impellar pump manufactured by the Jabsco Pump Company.

As particularly illustrated in FIGS. 2, 3 and 4, wetted wall funnel 10 is comprised of an inverted, truncated, conical member 62 terminating at its smaller end in a flange 54 and at its upper end in a flange 64, these flanges having a plurality of bolt holes 56 and 74, respectively. A perforated annular ring 66 having a relatively large central opening and a plurality of small perforations 68 substantially uniformly disposed about its periphery is inserted into conical member 62 and positioned therein adjacent to the larger diameter end thereof. The larger diameter end of conical member 62 is fitted with a coverplate 70 having a plurality of bolt holes 72 which mate with bolt holes 74 in flange 64. Also, cover plate 70 has a central larger diameter aperture 76 to receive solids conduit 24, and an axially aligned, cylindrical ring 78 that projects downwardly from the bottom of cover plate 70 sufficiently to project through the central opening in ring 66. Conical member 62, annular ring 66, cover plate 70 and cylindrical ring 78 define an annular chamber 80 into which liquid is introduced through liquid conduit 46 connected to tangential nozzle 82. The liquid is discharged from annular chamber 80 through the perforations 68 so that it is substantially uniformly distributed over the interior wall of conical member 62.

It is preferred that the apparatus have the flexibility of discharging particulated solids from solids container 12 at various controlled rates without throttling with valve 26. The solids induction rate can be controlled by varying the size of solids conduit 24, by placing an orifice in solids conduit 24, by varying the speed or size of pump 60, or by introducing nitrogen or other inert gas into wetted wall funnel 10 to control the vacuum induced therein.

In operation, the particulated solid material to be dispersed in the liquid is placed in solids container 12, which is maintained open to the atmosphere or, alternatively, supplied with inert gas to maintain substantially atmospheric pressure in the hopper above the solids bed. The liquid is flowed past the throat of wetted wall funnel 10 at a substantially uniform rate and additional liquid distributed substantially uniformly over the interior surface of wetted wall funnel 10, preferably at a rate of about 0.05 to about 0.4 gallons per square foot of wetted surface of said funnel. A vacuum is induced in the liquid conduit at the throat of wetted wall funnel 10 by means of a pump in liquid conduit 40 downstream of the throat of the funnel that has a pumping capacity exceeding the total volume of liquid supplied to the funnel and flowed past the throat of the funnel. It is preferred that a vacuum of at least 15 inches of mercury be maintained at the throat of the funnel. The vacuum induced in wetted wall funnel 10 causes particulate solid material to flow from solids container 12 through solids conduit 24 and is discharged into the wetted wall funnel 10, where the solid material impinges upon the water flowing down the interior surface of the funnel. Preferably, the solids rate is controlled so that the solids are introduced into the wetted wall funnel at a rate of about 0.03 to 0.6 pounds per gallon of liquid flowing over the surface of the funnel. The particulate solid material and water exits the funnel through the throat and is admixed with the liquid flowing through liquid conduit 40. A small volume of air or inert blanket gas is induced to flow from solids feeder hopper 12 into wetted wall funnel 10 with the solids material, and is aspirated from the funnel along with the liquid and dispersed solid material, the amount of gas flow depending primarily upon the porosity and depth of the solids bed in solids feeder hopper 12.

The solids-liquid mixing apparatus and method of this invention can be employed to disperse substantially any relatively free-flowing particulated solid material in a liquid, and are particularly suited for the dispersion of difficulty soluble, water-soluble polymers and gums of synthetic or natural origin in an aqueous liquid such as water, brine or acid solutions.

Figure 5:
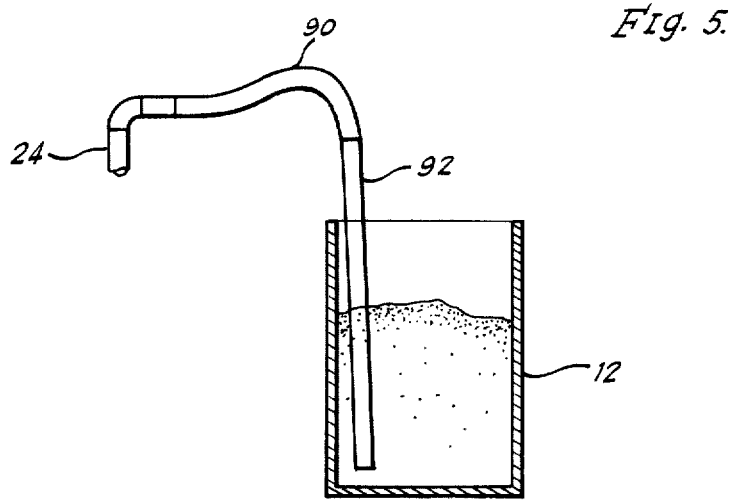
FIG. 5 is a side elevation view, partially in cross-section, schematically illustrating another embodiment of the solids container and solids conduit means.

FIG. 5 illustrates another embodiment of the invention which can be optionally provided for use where entry of air into the system is not particularly detrimental. In this embodiment, solids container 12 is an open drum, box or bin that can be conveniently placed on the ground or other supportive structure adjacent to wetted wall funnel 10. A flexible conduit 90, such as a hose or the like, is attached to solids conduit 24. The hose can be readily inserted into open solids container 12 and used to vacuum solids from container 12. Alternatively, hose 90 can be provided with a rigid lance 92 for insertion into the solids mass.

The invention is further described by the following example which is illustrative of a specific mode of practicing the invention and is not intended as limiting the scope of the invention as defined by the appended claims.

The method of this invention is illustrated by the practice of the invention to produce an aqueous solution of polyacrylamide useful as a displacement fluid in the recovery of petroleum from subterranean reservoirs by flooding. The apparatus employed is substantially as illustrated in FIGS. 1 through 5. The wetted wall funnel has an overall length of about 18 inches, a diameter of about 9 inches at its largest cross-section, and a throat diameter of about 3 inches. Solids feeder hopper 12 is a drum open to the atmosphere, and is set on the ground adjacent to funnel 10. Water is supplied through a 2-inch diameter supply conduit at a flow rate of about 90 gpm, with approximately 10 gpm, being diverted to the wetted wall funnel. Tee section 50 is constructed of 1-inch diameter pipe and pump 60 is a belt driven, self-priming 2-inch, flexible impeller Jabsco pump having a capacity of 91 gpm at 2100 rpm driven by a 3 horsepower, 3450 rpm electric motor. The pump has sufficient capacity to produce a vacuum of about 19 inches Hg at the throat of the wetted wall funnel. Finely divided polyacrylamide polymer is placed in solids feed hopper 12 and agitated to induce its flow through a 1-inch diameter conduit into the wetted wall funnel. The polyacrylamide powder is dissolved in water to provide a lump-free solution containing about 3000 ppm of the polyacrylamide.

Various embodiments and modifications of this invention have been described in the foregoing specification, and further modifications will be apparent to those skilled in the art. Such modifications are included within the scope of this invention as defined by the following claims.

Having now described my invention, I claim:

1. A solids-liquid mixing apparatus for dispersing a particulate solid material in a liquid, which comprises:
   a wetted wall funnel having a throat of reduced cross-section;
   a solids container;
   frame means for supporting said wetted wall funnel in a substantially vertical position with said throat at the bottom;
   solids conduit means communicating said solids container and said wetted wall funnel for conducting particulate solid material from said solids container to said wetted wall funnel;
   liquid distributor means for flowing liquid substantially uniformly over the interior surface of said wetted wall funnel;
   liquid conduit means attached to and communicating with the throat of said wetted wall funnel for flowing liquid past the throat of said funnel; and
   a pump installed in said liquid conduit means downstream of said wetted wall funnel, said pump having a volumetric capacity exceeding the combined volumetric liquid supply rate to said apparatus whereby a vacuum is induced in said liquid conduit means adjacent to the throat of said wetted wall funnel.

2. The apparatus defined in claim 1 wherein said liquid distributor means comprises an annular chamber at the large end of said wetted wall funnel, a liquid inlet conduit to introduce liquid into said chamber, and a plurality of discharge apertures located substantially uniformly about the periphery of said annular chamber.

3. The apparatus defined in claim 1 wherein said solids container is a closed vessel and including means to maintain a blanket of gas in said container at substantially atmospheric pressure.

4. The apparatus defined in claim 1 wherein said solids container has an open top and wherein said solids conduit means is a flexible conduit that is insertable into said solids container.

5. A solids-liquid mixing apparatus for dispersing a particulate solid in a liquid, which comprises:
   a wetted wall funnel having a throat of reduced cross-section and an annular chamber at its large end, said chamber having a plurality of discharge apertures to distribute liquid within said annular chamber substantially uniformly over the interior surface of said wetted wall funnel;
   frame means for supporting said wetted wall funnel in a substantially vertical position with said throat at the bottom;
   a solids container;
   solids conduit means communicating said solids container and said wetted wall funnel for conducting particulate solid material from said solids container to said wetted wall funnel;
   liquid inlet means to introduce liquid into said annular chamber;
   liquid conduit means attached to and communicating with the throat of said wetted wall funnel for flowing liquid past the throat of said funnel; and
   a pump installed in said liquid conduit means downstream of said wetted wall funnel, said pump having a volumetric capacity exceeding the combined volumetric liquid supply rate to said apparatus whereby a vacuum is induced in liquid conduit means adjacent to the throat of said wetted wall funnel.

6. The apparatus defined in claim 5 wherein said solids container is closed vessel and including means to maintain a blanket of gas in said vessel at substantially atmospheric pressure.

7. The apparatus defined in claim 5 wherein said solids container has an open top and wherein said solids conduit means is a flexible conduit that is insertable into said solids container.

8. A solids-liquid mixing apparatus for dispersing a particulate solid in a liquid, which comprises:

a wetted wall funnel comprised of (1) a truncated conical member having a throat of reduced cross-section, (2) a flat annular ring having a relatively large central opening and plurality of small apertures substantially uniformly disposed about its periphery, said ring being radially mounted at an intermediate location within said conical member adjacent to the large diameter end of said conical member, (3) a cover plate removably secured to the large diameter end of said conical member, said cover plate having an axially aligned cylindrical baffle projecting downwardly from the bottom of said coverplate and through the central opening in said flat ring, whereby an annular chamber is formed at the large end of said conical member;

frame means for supporting said wetted wall funnel in a substantially vertical position with said throat at the bottom;

a solids container;

liquid inlet means for introducing liquid into said annular chamber;

a solids conduit communicating said solids container and said wetted wall funnel;

a Tee-shaped liquid conduit section removably attached to the throat of said conical member;

liquid conduit means attached to and communicating with said Tee-shaped liquid conduit section for flowing liquid through said Tee-shaped conduit section past the throat of said conical member; and a pump installed in said liquid conduit means downstream of said wetted wall funnel, said pump having a volumetric capacity exceeding the combined volumetric liquid supply rate to said apparatus whereby a vacuum is induced in said liquid conduit means adjacent to the throat of said wetted wall funnel.

9. The apparatus defined in claim 8 wherein said solids container is a closed vessel and including means to maintain a blanket of gas in said vessel at substantially atmospheric pressure.

10. The apparatus defined in claim 8 wherein said solids container has an open top and wherein said solids conduit means is a flexible conduit that is insertable into said solids container.

11. A method for dispersing a particulate solid material in a liquid, which comprises:

distributing a first portion of said liquid substantially uniformly over the interior surface of a wetted wall funnel having a throat of reduced cross-section at its bottom;

flowing said particulated solid material from a reservoir of said material into contact with said liquid in said funnel;

flowing a second portion of said liquid past the open throat of said wetted wall funnel; and maintaining a vacuum at the throat of said funnel whereby said first portion of said liquid and said particulated solid material are withdrawn from said funnel and admixed with said second portion of said liquid.

12. The method defined in claim 11 wherein said first portion of said liquid is introduced into said wetted wall funnel in the amount of about 0.05 to 0.4 gallons per square foot of wetted surface of said funnel.

13. The method defined in claim 11 wherein said particulate solid material is introduced into said wetted wall funnel in an amount equivalent to about 0.03 to 0.6 pounds per gallon of said first portion of liquid.

14. The method defined in claim 11 wherein a vacuum of at least about 15 inches of mercury is maintained at the throat of said funnel.

15. The method defined in claim 11 wherein a blanket of gas at substantially atmospheric pressure is maintained over said reservoir of particulate solid material.

* * * * *

UNITED STATES PATENT OFFICE
CERTIFICATE OF CORRECTION

Patent No. 3,893,655           Dated July 8, 1975

Inventor(s) Burton B. Sandiford

It is certified that error appears in the above-identified patent and that said Letters Patent are hereby corrected as shown below:

The term of this patent subsequent to January 1, 1991, has been disclaimed.

Signed and Sealed this

Twentieth Day of July 1976

[SEAL]

Attest:

RUTH C. MASON
*Attesting Officer*

C. MARSHALL DANN
*Commissioner of Patents and Trademarks*